(12) United States Patent
Hashimoto et al.

(10) Patent No.: US 7,075,965 B2
(45) Date of Patent: Jul. 11, 2006

(54) WAVELENGTH CONVERSION LASER APPARATUS

(75) Inventors: Sonhi Hashimoto, Tokyo (JP); Toshifumi Tone, Tokyo (JP); Satoru Amano, Tokyo (JP)

(73) Assignee: ORC Manufacturing Co., Ltd., Tokyo (JP)

( * ) Notice: Subject to any disclaimer, the term of this patent is extended or adjusted under 35 U.S.C. 154(b) by 185 days.

(21) Appl. No.: 10/638,110

(22) Filed: Aug. 7, 2003

(65) Prior Publication Data

US 2004/0141534 A1    Jul. 22, 2004

(30) Foreign Application Priority Data

Jan. 17, 2003    (JP) .............................. 2003-009328

(51) Int. Cl.
*H01S 3/109*    (2006.01)
(52) U.S. Cl. ......................................... 372/103; 372/98
(58) Field of Classification Search .................. 372/21, 372/22, 103
See application file for complete search history.

(56) References Cited

U.S. PATENT DOCUMENTS 5,058,118 A * 10/1991 Qui et al. ..................... 372/21
5,438,579 A * 8/1995 Eda et al. ..................... 372/34
5,446,750 A * 8/1995 Ohtsuka et al. ............... 372/34
5,696,781 A * 12/1997 Hyuga .......................... 372/21
5,805,626 A * 9/1998 Komatsu et al. .............. 372/41

* cited by examiner

*Primary Examiner*—Minsun Oh Harvey
*Assistant Examiner*—Tuan N. Nguyen
(74) *Attorney, Agent, or Firm*—Dellett & Walters

(57) ABSTRACT

The present invention is a wavelength conversion laser apparatus for converting wavelength by utilizing a nonlinear optical crystal and capable of safely using it over a long time. For this end, the fundamental wave laser light emitted from the pumping chamber unit 3 which is a solid state laser light source is converted into the second harmonic wave by the first nonlinear optical crystal unit 20. And the second harmonic wave is, then, converted into the third (or fourth) harmonic wave by the second nonlinear optical crystal unit 30. Filled in the container 24, 35 for each of the nonlinear optical crystal units 20, 30 is a dry inert gas. A humidity sensor 51 detects humidity inside the container. The output from the humidity sensor 51 is supplied to the laser control portion 58. When the detected humidity exceeds a predetermined value, the laser oscillation is interrupted, thereby preventing the nonlinear optical crystal from being damaged in case of any defect in the sealing structure of the container.

15 Claims, 3 Drawing Sheets

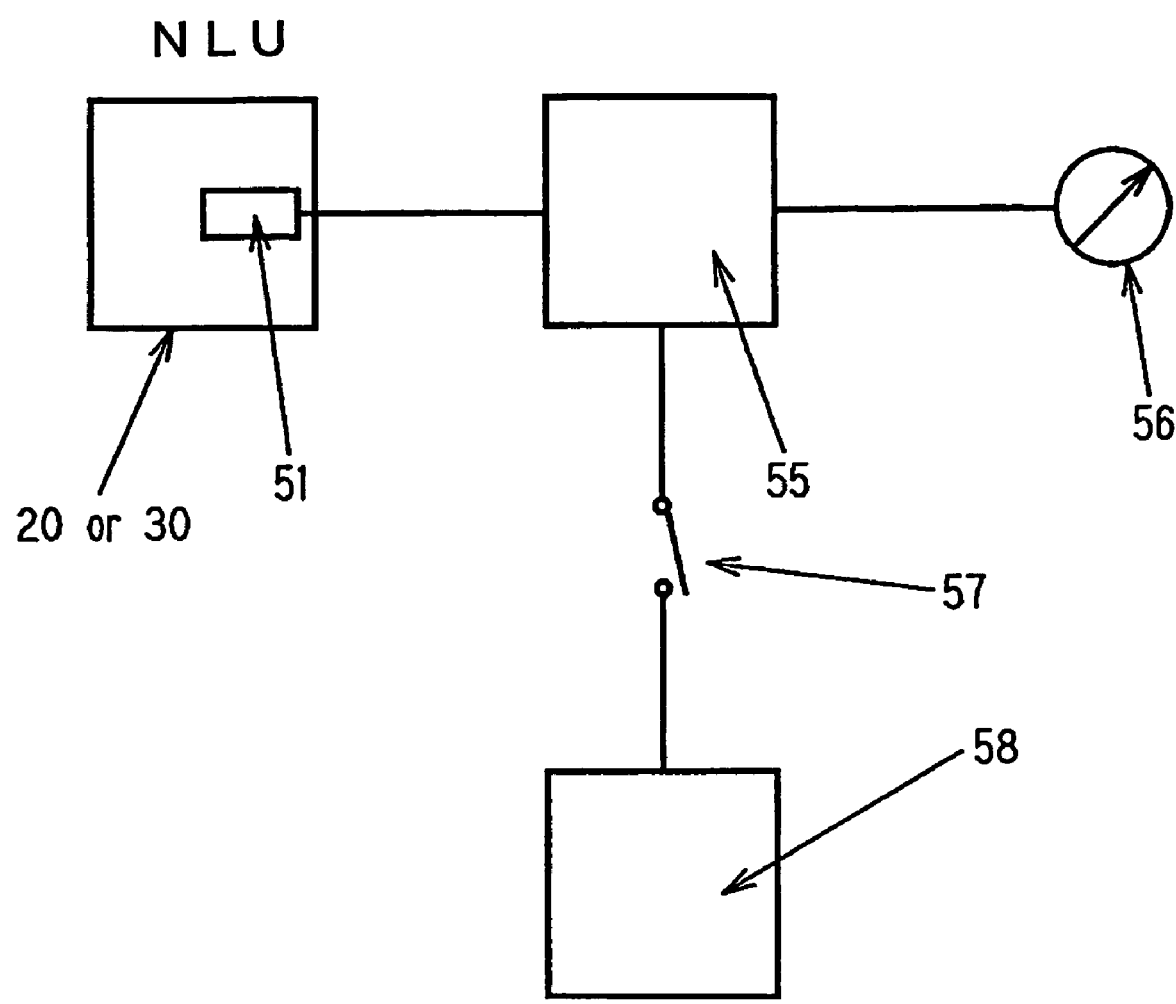

WAVELENGTH CONVERSION LASER APPARATUS

BACKGROUND OF THE INVENTION

1. Field of the Invention

The present invention relates to a wavelength conversion laser apparatus for converting wavelength by utilizing a nonlinear optical crystal, more specifically to a wavelength conversion laser apparatus in which the nonlinear optical crystal can be easily managed.

2. Description of Related Art

In short wavelength laser apparatus, nonlinear optical crystals are generally utilized for wavelength conversion. Ultra violet solid state laser devices among such laser apparatus are generally constructed as follows. A fundamental wave laser light of 1064 nm in wavelength is oscillated by a Nd:YAG laser, Nd:YVO$_4$ laser or the like. The nonlinear optical crystal generates a second harmonic wave of the fundamental wave laser light. Furthermore, third and fourth harmonic waves are also generated by nonlinear optical crystals. Crystals to be utilized for generating the second harmonic wave include an LBO crystal or a KTP crystal. Crystals to be utilized for generating the third harmonic wave include an LBO crystal, a BBO crystal or GdYCOB crystal. Crystals to be utilized for generating the fourth harmonic wave include a BBO crystal, a CLBO crystal or the like. Most of such nonlinear optical crystals are deliquescent. In order to prevent them from degrading by moisture absorption, it is required to pay special attention to atmosphere where the crystals are disposed, especially humidity where they are used.

Particularly, a CLBO crystal which is the nonlinear optical crystal to be utilized for generating the fourth harmonic wave exhibits significant crystal degradation in 30% or higher relative humidity. A crystal cell model no. 10031 commercially available from Crystal Association Inc. employs a method for filling a dry gas in the cell. Alternatively, there is an instance where a nonlinear optical crystal is used in dipping into oil. In Japanese patent non-examined publication no. 9-292638 (or JP-A-292638/94) entitled "High Output Ultra Violet Laser Light Generation Apparatus", a deliquescent-free protection film is formed on the ultra violet light output end surface of the nonlinear optical crystal.

However, one problem associated with such conventional technique of simply filling a dry gas in a crystal cell is a limited lifetime. In other words, if any defect may occur in the sealing structure during a long time use, humidity in the sealed container tends to change. If the laser is continuously used in high humidity condition inside the cell, the nonlinear optical crystal is increasingly degraded and damaged. This accompanies with significant decrease in wavelength conversion efficiency and thus significant decrease in the laser output.

SUMMARY OF THE INVENTION

It is, therefore, an object of the present invention to provide a wavelength conversion laser apparatus that can be safely used for a long time by controlling the laser light generation operation by accurately detecting any humidity change in atmosphere of the nonlinear optical crystal.

In order to achieve the above object, the wavelength conversion laser apparatus according to the present invention includes harmonic wave generation means for receiving the laser light of a predetermined wavelength and generating the harmonic wave thereof, and the harmonic wave generation means comprises a sealed container formed with a through-hole through which the laser light propagates and windows at the laser light incident and output sides of the through-hole, a nonlinear optical crystal disposed in the through-hole and a humidity sensor disposed in the through-hole. In this arrangement, humidity change in atmosphere of the nonlinear optical crystal can be accurately detected.

Additionally, a control portion for controlling the laser light source is provided. When humidity in atmosphere of the nonlinear optical crystal is increased, the laser light source is interrupted to prevent the nonlinear optical crystal from being damaged.

In the wavelength conversion laser apparatus which is constructed as described hereinabove, the humidity sensor continuously and accurately monitors humidity in the cell in which the nonlinear optical crystal is accommodated, thereby enabling the user to use the wavelength conversion laser apparatus without any fear of damaging the nonlinear optical crystal. It is to be noted that the units for generating the harmonic wave are connected in series to generate sequentially higher order of harmonic waves.

Additionally, the provision of the control portion for controlling the laser light source by receiving the signal from the humidity sensor enables to stop the laser light source and prevent the nonlinear optical crystal from being damaged in case when humidity in atmosphere of the nonlinear optical crystal is increased.

BRIEF DESCRIPTION OF THE DRAWINGS

FIG. 4 is a simplified block diagram of a humidity monitoring apparatus of the embodiment of the wavelength conversion laser apparatus.

DESCRIPTION OF THE PREFERRED EMBODIMENT

Now, an embodiment of the present invention will be described in detail hereunder by reference to the accompanying drawings, namely FIG. 1 through FIG. 4.

An embodiment of the present invention is the wavelength conversion laser apparatus in which a humidity sensor for detecting humidity in a sealed container filled with a dry inert gas and for accommodating a nonlinear optical crystal which generates harmonic waves upon receiving a laser light having a predetermined wavelength, and the humidity sensor is connected to a laser control portion.

Figure 1:
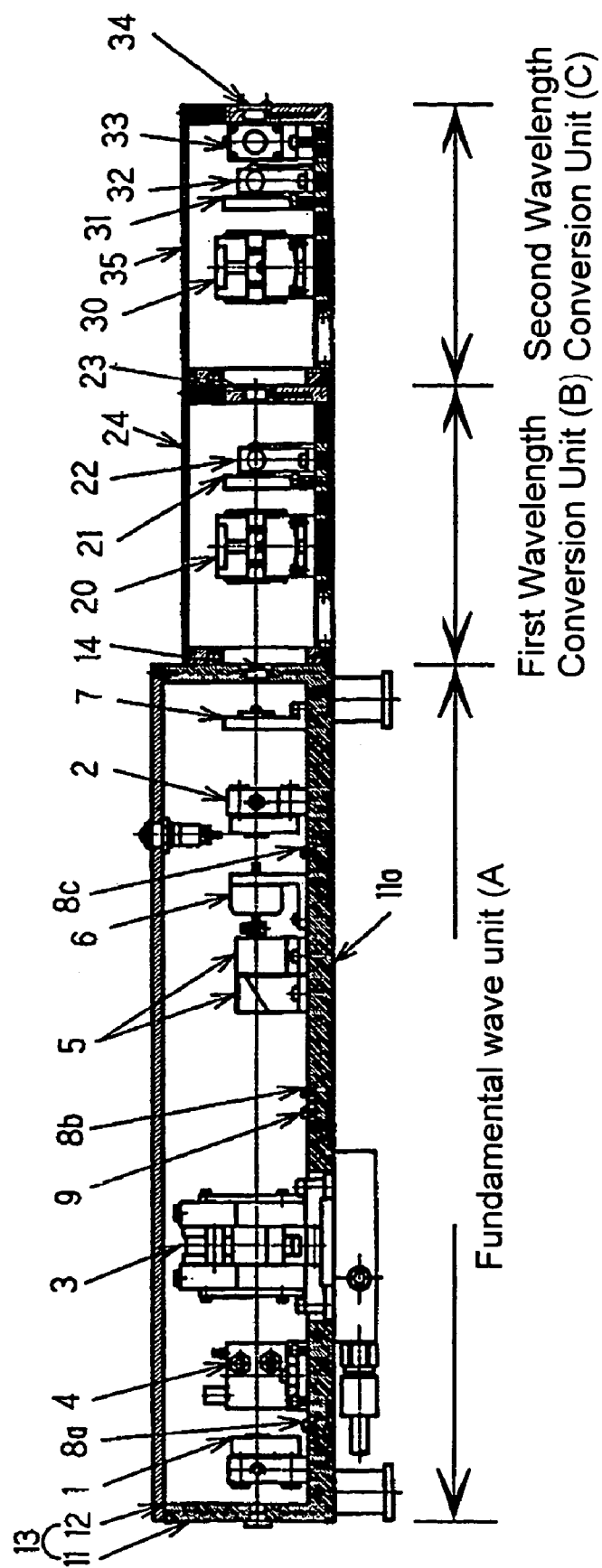
FIG. 1 is a simplified side cross sectional view of one embodiment of the wavelength conversion laser apparatus according to the present invention.

FIG. 1 illustrates a simplified side cross sectional view of one embodiment of the wavelength conversion apparatus according to the present invention. In FIG. 1, mirrors 1 and 2 are reflection mirrors which constitute a resonator for the fundamental wave laser light. A pumping chamber unit 3 is a unit including a solid state laser medium (such as Nd:YAG, Nd:YVO$_4$, etc.) to be excited by a semiconductor laser. A Q switch 4, a Brewster plate 5, a shutter 6 and a first focusing lens 7 are basic elements constituting a solid state laser.

Heaters 8a, 8b, 8c are heating means for maintaining the solid state laser at constant temperature. A temperature sensor 9 is means for detecting temperature of the solid state laser. A case 11 is a case to constitute a container of the fundamental wave unit (A). The case 11 is U-shape in cross section and has a window for outputting the fundamental wave laser light. A cover member 12 is a cover of the container of the fundamental wave unit (A) for hermetically covering the upper face of the case 11. The container 13 is a container for accomodating the fundamental wave unit (A) and comprises the case 11 and the cover member 12.

A first nonlinear optical crystal unit 20 is a unit which contains an LBO crystal, a KTP crystal or the like for converting the fundamental wave laser light having the predetermined wavelength (angular oscillation frequency $\omega$) into a second harmonic wave (angular oscillation frequency 2 $\omega$). A second focusing lens 21 is a lens which focuses the second harmonic wave. A separation mirror 22 is a half mirror which separates the fundamental wave from the second harmonic wave. An output window 23 is a window through which the second harmonic wave is outputted. A unit case 24 is a case which accommodates a first wavelength conversion unit (B).

A second nonlinear optical crystal unit 30 is a unit which converts the laser light from the first wavelength conversion unit (B) into a third harmonic wave (or a fourth harmonic wave). A collimation lens 31 is a lens which converts the third harmonic wave (or fourth harmonic wave) into a parallel light. A separation mirror 32 is a half mirror which separates the second harmonic wave from the third (or fourth) harmonic wave. A power meter 33 is means which measures the output of the third or fourth harmonic wave. An output window 34 is a window through which the third (or fourth) harmonic wave is outputted outside the unit. A unit case 35 is a container which accommodates the second wavelength conversion unit (C).

The wavelength conversion laser apparatus as illustrated in FIG. 1 comprises the fundamental wave unit (A), the first wavelength conversion unit (B) and the second wavelength conversion unit (C). The fundamental wave unit (A) comprises basic optical units such as the mirrors 1 and 2, the pumping chamber unit 3, the Q switch 4, the Brewster plate 5, the shutter 6, the first focusing lens 7, etc. The elements constituting the fundamental wave unit (A) are accommodated in the container 13. Filled in the container 13 is an inert gas such as nitrogen or the like. The heaters 8a, 8b, 8c are suitably buried in the bottom portion 11a of the case 11. The temperature sensor 9 for monitoring temperature in the container 13 is disposed near the pumping chamber unit 3.

The first wavelength conversion unit (B) comprises the first nonlinear optical crystal unit 20, the focusing lens 21 and the separation mirror 22. The first nonlinear optical crystal unit 20 includes an LBO crystal, a KTP crystal or the like which converts the fundamental wave laser light which is focused by the focusing lens 7 and propagates through the window 14 into the second harmonic wave. The separation mirror 22 is a half mirror which separates the fundamental wave from the second harmonic wave. These optical devices are accommodated in the unit case 24 which is provided with the output window 23.

On the other hand, the second wavelength conversion unit (C) comprises the second nonlinear optical crystal unit 30, the collimation lens 31, the separation mirror 32 and the power meter 33. The optical devices such as the second nonlinear optical crystal unit 30, the collimation lens 31, the separation mirror 32 and the power meter 33 are accommodated in the unit case 35 which is provided with the output window 34. The above described construction is the same as the conventional wavelength conversion laser apparatus.

Figure 2:
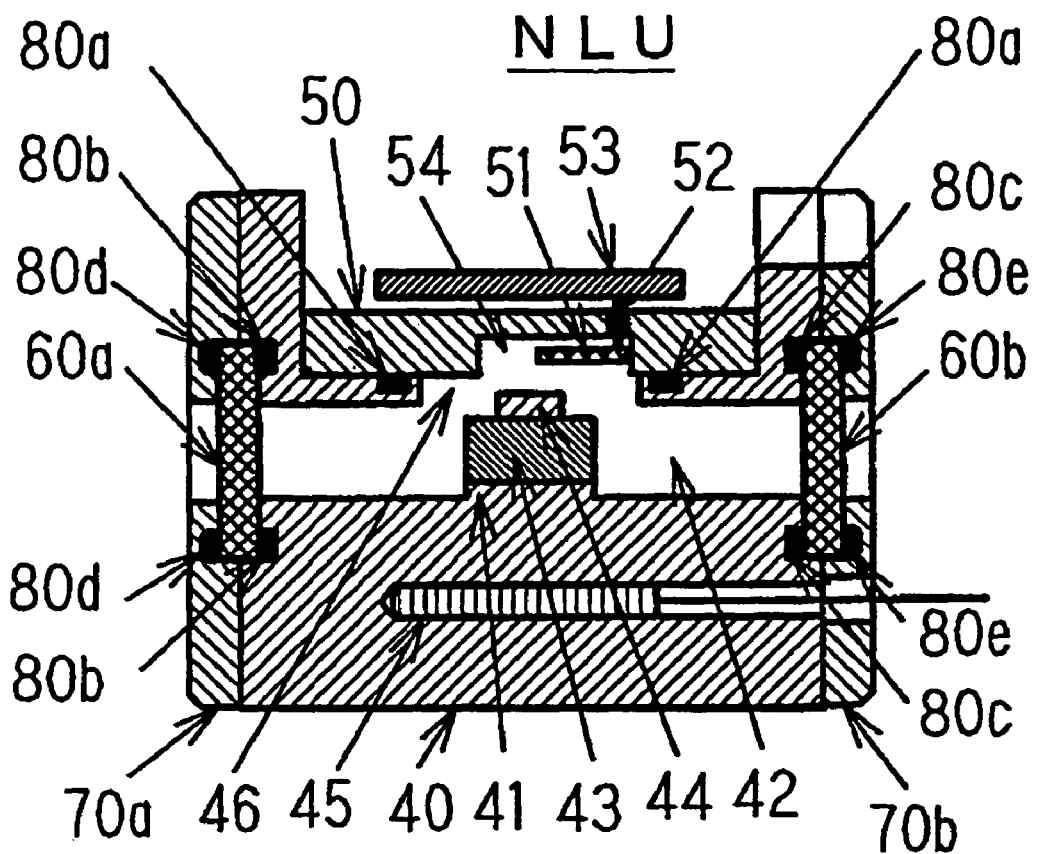
FIG. 2 is a simplified cross section view of a nonlinear optical crystal cell in the embodiment of the wavelength conversion laser apparatus.

FIG. 2 is a simplified cross section view of the nonlinear optical crystal cell of the embodiment of the wavelength conversion laser apparatus according to the present invention. In FIG. 2, the cell main body 40 corresponds to the first nonlinear optical crystal unit 20 or the second nonlinear optical crystal unit 30. A foundation table 41 is a table on which the nonlinear optical crystal is placed. A through-hole 42 is a path through which the laser light propagates. A nonlinear optical crystal 43 is an LBO crystal or the like. A nonlinear optical crystal holder 44 is a member which holds down the nonlinear optical crystal on the table 41. A heater 45 is heating means which keeps the cell at constant temperature.

An opening portion 46 is an opening in the cell main body 40. A cell cover member 50 is a cover of the cell. A humidity sensor 51 is means which measures humidity of the cell. A hermetic seal terminal 52 is a pick-up port for a lead. A humidity detection circuit board 53 is a circuit board for a hygrometer. A recessed portion 54 is a portion in which the humidity sensor 51 is accommodated in the cell cover member 50. A humidity detection amplifier circuit 55 as shown in FIG. 4 is a circuit of the hygrometer. Cell windows 60a, 60b are input and output ports for the laser light. Nonlinear optical crystal cell holders 70a, 70b are members which hold down the windows 60a, 60b. O-rings 80a, 80b, 80c, 80d, 80e are hermetic sealing members.

Now, the first or second nonlinear optical crystal unit 20, 30 is collectively referred to as a nonlinear optical crystal unit (NLU) hereinafter. The nonlinear optical crystal unit (NLU) comprises the cell main body 40 of U-shape in cross section and having the through-hole through which the laser light propagates in the horizontal direction and the cell cover member 50 which hermetically covers the opening portion 46 of the cell main body 40. The foundation table 41 is provided at the center portion of the cell main body 40 which defines the through-hole 42. Disposed on the foundation table 41 is the nonlinear optical crystal 43 which generates the harmonic wave. The nonlinear optical crystal 43 is secured on the cell main body 40 by the crystal holder 44.

The recessed portion 54 is formed in the bottom surface of the cell cover member 50, i.e., the surface which faces the through-hole 42. The humidity sensor 51 is mounted inside the recessed portion 54 and at a location remote from the through-hole 42 so that the laser light is not interfered. In order to achieve electrical insulation, the humidity sensor 51 is connected through the hermetic seal terminal 52 to the humidity detection circuit board 53 which is provided outside the cell main body 40 (i.e., on the cell cover member 50).

Disposed at both left and right ends of the through-hole 42 are the cell windows 60a, 60b which hermetically seal the nonlinear optical crystal unit (NLU), the window holders 70a, 70b which secure the cell windows 60a, 60b onto the cell main body 40 by interposing the O-rings 80a, 80b, 80c, 80d, 80e between the cell main body 40 and the cell cover member 50. An inert gas such as Ar, $N_2$ or the like is filled in the sealed unit (NLU) which has the above construction. The heater 45 is buried in the cell main body 40 so as to maintain temperature of the unit constant.

The O-rings 80a, 80b, 80c, 80d, 80e used herein are resistant to high temperature. Preferably, carlet material which is commercially available from DuPontDow Elastomer Inc. is used as the O-rings 80 because it has very low gas emission and gas permeability and yet provides a long sealing lifetime. Used as the cell windows 60a, 60b which are disposed in the propagation path of the laser light is synthetic quartz glass or $CaF_2$ which can resist high output laser.

Used as the humidity sensor 51 is an electrical capacity type humidity sensing device which is formed by vapor deposition on a glass substrate and emits no gas from the sensor portion. The humidity sensor 51 is highly durable. In order to detect humidity in the through-hole 42, the humidity sensing device is mounted on one side surface portion of the cover member at the location which does not interrupt the through-hole 42. Since the humidity sensor 51 is disposed in the medium which does not interrupt the propagation path of the laser light, it causes no adverse effect on the use of the laser apparatus. The humidity sensing device is connected to the humidity detection circuit board 53 which is disposed on the other side surface of the cover member 50 through the hermetic seal terminal 52 in order to electrically isolate the cell cover member 50.

Figure 3:
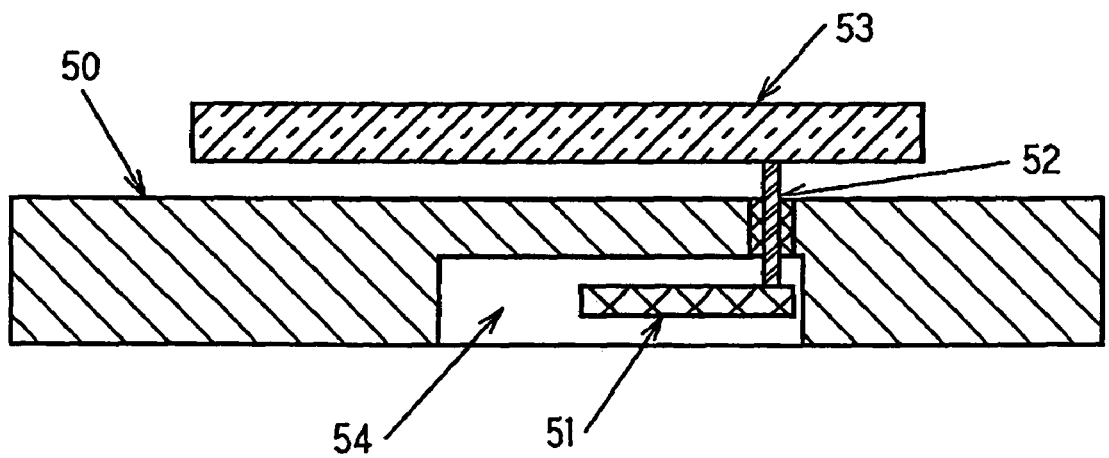
FIG. 3 is a simplified cross section view of a cover member for the nonlinear optical crystal cell of the embodiment of the wavelength conversion laser apparatus.

Now, illustrated in FIG. 3 is a simplified cross section view of the cover member of the nonlinear optical crystal cell which constitutes the embodiment of the wavelength conversion laser crystal cell. On the other hand, illustrated in FIG. 4 is a simplified block diagram of the humidity monitoring apparatus of the embodiment of the wavelength conversion laser apparatus according to the present invention. In FIG. 3 and FIG. 4, the hygrometer 56 is means which measures humidity. A switch 57 is one which turns the laser light on or off. A laser control portion 58 is an apparatus for controlling the laser light source. The output from the humidity sensor 51 in the unit (NLU) is supplied to the hygrometer 56 by way of the humidity detection amplifier circuit 55 which is provided on the humidity detection circuit board 53. The output of the humidity detection amplifier circuit 55 is supplied by way of the switch 57 to the laser control portion 58 which shuts off the operation of the laser apparatus.

Now, operation of the embodiment of the wavelength conversion laser apparatus according to the present invention which has the abovementioned construction will be described hereunder. Firstly, the outline function of the wavelength conversion laser apparatus will be described by reference to FIG. 1. A solid state laser medium is utilized as the laser light source. The fundamental wave laser light of 1064 nm emitted from the pumping chamber unit 3 which is the fundamental laser light is focused by the focusing lens 7 and propagates into the first nonlinear optical crystal unit 20 through the window 14. The first nonlinear optical crystal unit 20 is an LBO crystal, a KTP crystal or the like which converts the fundamental wave laser light which is focused by the focusing lens 7 and propagates through the window 14 into the second harmonic wave, i.e., the laser light of 532 nm in wavelength. A part of the fundamental wave laser light which is an incident light to the first optical crystal unit 20 is converted into the second harmonic wave by the first optical crystal unit 20 and is outputted from the nonlinear optical crystal. The separation mirror 22 separates the fundamental wave from the second harmonic wave.

Furthermore, the incident fundamental wave laser light and the second harmonic wave which are propagated through the focusing lens 21 and the output window 23 are inputted to the second nonlinear optical crystal unit 30. The second nonlinear optical crystal unit 30 converts the laser light from the first wavelength conversion unit (B) into the third harmonic wave of 355 nm in wavelength (or the fourth harmonic wave of 266 nm in wavelength). The nonlinear optical crystal converts the laser light from the first wavelength conversion unit (B) into the third or fourth harmonic wave before being outputted from the output window 34. The separation mirror 32 separates the second harmonic wave from the third (or fourth) harmonic wave. An LBO crystal, a BBO crystal or GdYCOB crystal may be utilized as the nonlinear optical crystal which generates the third harmonic wave. On the other hand, a BBO crystal or a CLBO crystal may be utilized as the nonlinear optical crystal which generates the fourth harmonic wave. By controlling temperature of the heaters 8a, 8b, 8c by way of a temperature controlling apparatus (not shown) based on the output from the temperature sensor 9, temperature inside the container is always maintained at desired value. What is described hereinabove is the same as the conventional wavelength conversion laser apparatus.

Now, the operation of the nonlinear optical crystal unit (NLU) will be described hereunder by reference to FIG. 2 and FIG. 3. The incident laser light to the nonlinear optical crystal unit is converted into the harmonic wave and outputted from the nonlinear optical crystal. The heater 45 which is buried in the cell main body 40 is utilized to maintain temperature of the unit constant. The humidity sensor 51 detects humidity inside the through-hole 42. It is possible to dispose the humidity sensor 51 in the cell main body 40 through the opening portion 46 in the cell main body 40. Because the humidity sensor 51 and the humidity detection circuit board 53 are disposed on the cell cover member 50, it is possible to mount the humidity sensor 51 at the appropriate location of the nonlinear optical crystal unit when the cover member 50 is assembled. It is also easy to inspect these devices.

Now, the operation of the humidity monitoring apparatus will be described by reference to FIG. 4. The output from the humidity sensor 51 in the unit (NLU) is supplied to the hygrometer 56 by way of the humidity detection amplifier circuit 55 which is provided in the humidity detection circuit board 53. The output of the humidity detection amplifier circuit 55 is supplied by way of the switch 57 to the laser control portion 58 which interrupts the operation of the laser apparatus. Provision of the humidity sensor 51 in the nonlinear optical crystal unit (NLU) enables the user of the laser apparatus to monitor humidity inside the nonlinear optical crystal unit (NLU) by the hygrometer 56. As a result, it is possible to manually (or automatically) turn off the switch 57 and to interrupt the laser oscillation when humidity exceeds a predetermined value.

As understood from the above description, the embodiment of the wavelength conversion laser apparatus according to the present invention features in that a dry inert gas is filled in the sealed container accommodating the nonlinear optical crystal which generates the harmonic wave of the laser light of a predetermined wavelength and that the humidity sensor which detects humidity inside the sealed container is provided and connected to the laser control portion. Accordingly, if the humidity sensor detects any humidity increase, the laser is immediately controlled to stop oscillation, thereby preventing the nonlinear optical crystal from being damaged.

What is claimed is:

1. A wavelength conversion laser apparatus including harmonic wave generator which receives a laser light having a predetermined wavelength and generates a harmonic wave thereof, characterized in that:

said harmonic wave generator comprises a sealed container having windows at the laser light incident side and the laser light output side of a through-hole through which the laser light propagates, a nonlinear optical crystal having deliquescence and provided in the through-hole, and a humidity sensor provided in the through-hole to detect humidity inside said container, further comprising a control portion responsive to said humidity sensor to shut off operation of at least a portion of said laser apparatus to prevent damage to said nonlinear optical crystal from excessive humidity.

2. A wavelength conversion laser apparatus according to claim 1, wherein said control portion operates a switch to shut off laser operation.

3. A wavelength conversion apparatus of claim 1, wherein said sealed container comprises a main body in which said through-hole is formed and a cover member having an inner side surface which faces said through-hole.

4. A wavelength conversion laser apparatus of claim 3, wherein said humidity sensor is mounted on the inner side surface of said cover member.

5. A wavelength conversion laser apparatus of claim 4, wherein said humidity sensor is disposed at a location not interfering said through-hole.

6. A wavelength conversion laser apparatus of any one of claims 3–5, wherein said humidity sensor is connected to a circuit board disposed on the outer side surface of said cover member.

7. A wavelength conversion laser apparatus according to claim 6, wherein said nonlinear optical crystal is either one of LBO, KTP, BBO, GdYCOB and CLBO.

8. A wavelength conversion laser apparatus according to claim 6, wherein said humidity sensor includes an electrical capacitance type sensor device.

9. A wavelength conversion laser apparatus of claim 1, further including a control portion for controlling said laser light source, wherein said control portion is supplied with an output signal from said humidity sensor in order to control the laser light.

10. A wavelength conversion laser apparatus of any one of claims 1, 3, 4, 5 or 9, wherein said nonlinear optical crystal is either one of LBO, KTP, BBO, GdYCOB and CLBO.

11. A wavelength conversion laser apparatus of any one of claims 1, 3, 4, 5 or 9, wherein said humidity sensor includes an electrical capacitance type sensor device.

12. A wavelength conversion laser apparatus including harmonic wave generator which receives a laser light having a predetermined wavelength and generates a harmonic wave thereof, characterized in that:

said harmonic wave generator comprises a sealed container having windows at the laser light incident side and the laser light output side of a through-hole through which the laser light propagates, a nonlinear optical crystal having deliquescence and provided in the through-hole, and a humidity sensor to detect humidity inside said container, wherein said humidity sensor is disposed in said container at a location where is not interfered with the laser light passing thereto, and further comprising a control portion responsive to said humidity sensor to shut off operation of at least a portion of said laser apparatus to prevent damage to said nonlinear optical crystal from excessive humidity.

13. A wavelength conversion laser apparatus according to claim 12, wherein said control portion operates a switch to shut off laser operation.

14. A wavelength conversion laser apparatus including harmonic wave generator which receives a laser light having a predetermined wavelength and generates a harmonic wave thereof, characterized in that:

said harmonic wave generator comprises a sealed container having windows at the laser light incident side and the laser light output side of which the laser light propagates, a nonlinear optical crystal having deliquescence and provided in said container, and a humidity sensor to detect humidity inside said container, wherein said humidity sensor is disposed in said container at a location where is not interfered with the laser light passing thereto, further comprising a control portion responsive to said humidity sensor to shut off operation of at least a portion of said laser apparatus to prevent damage to said nonlinear optical crystal from excessive humidity.

15. A wavelength conversion laser apparatus according to claim 14, wherein said control portion operates a switch to shut off laser operation.

* * * * *